M. CHRISTMAN.
WHEEL HUB PLATE.
APPLICATION FILED JULY 1, 1912.
1,051,683.
Patented Jan. 28, 1913.
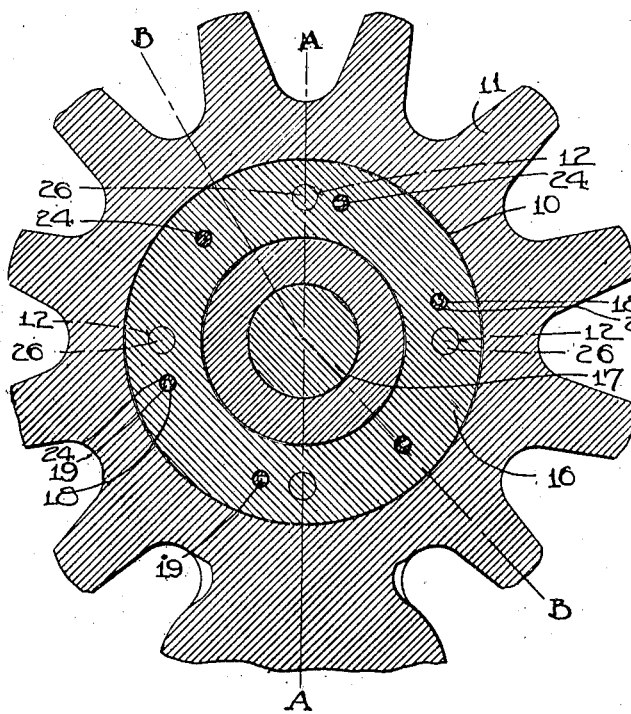
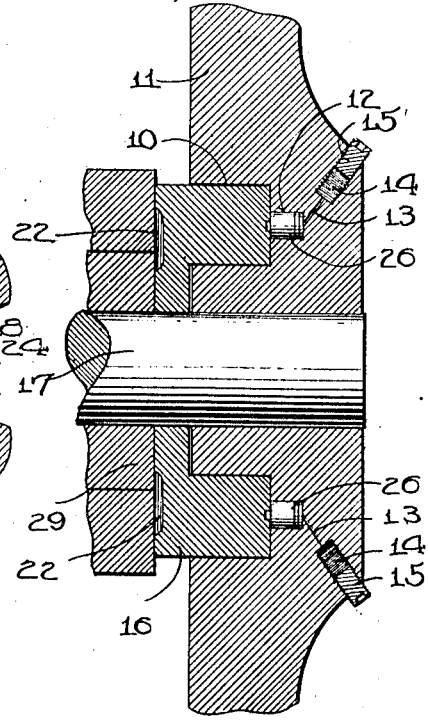
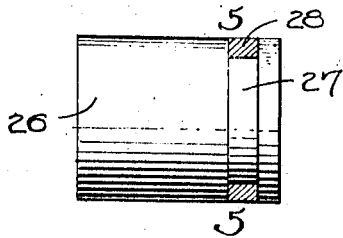
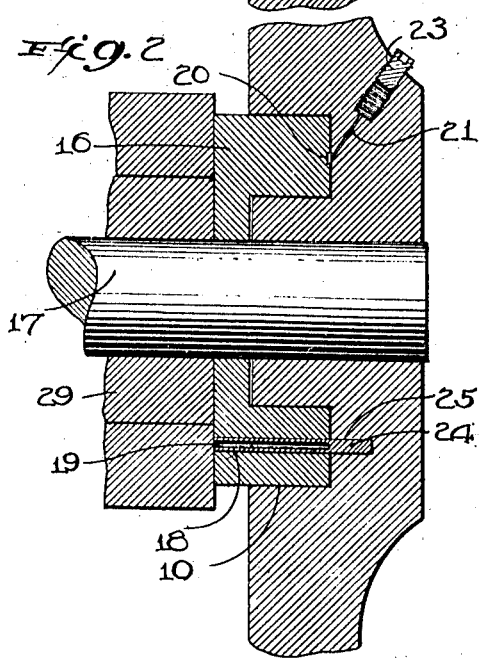
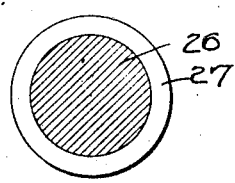
WITNESSES
INVENTOR
Matthias Christman
By F. E. Vrooman, his Attorney.

UNITED STATES PATENT OFFICE.

MATTHIAS CHRISTMAN, OF SPRINGFIELD, MISSOURI, ASSIGNOR OF ONE-THIRD TO HARRY L. BISSETT AND ONE-THIRD TO GEORGE A. McLAUGHLIN, BOTH OF SPRINGFIELD, MISSOURI.

WHEEL-HUB PLATE.

1,051,683.  Specification of Letters Patent.   Patented Jan. 28, 1913.

Application filed July 1, 1912. Serial No. 707,081.

*To all whom it may concern:*

Be it known that I, MATTHIAS CHRISTMAN, citizen of the United States, residing at Springfield, in the county of Greene and State of Missouri, have invented certain new and useful Improvements in Wheel-Hub Plates, of which the following is a specification, reference being had therein to the accompanying drawing.

This invention relates to hub plates and is an improvement over the hub plates shown in my former patents bearing numbers 1,028,677, and 1,020,885. These hub plates are placed in the hub of an engine wheel and fit in a socket formed in the inner face of the hub so that when the wheel is turning the plate will bear against the journal box, thus receiving the wear and preventing the hub of the wheel from being worn by coming in contact with the journal box. When the hub plate is worn out a new one can be easily inserted in its place.

The principal object of the invention is to so construct this hub plate that it will at all times be held in close contact with the journal box, thus preventing the wheel from having too much side play or lateral motion and thereby lengthening the life of the wheel. This is accomplished by providing a number of pistons extending into sockets formed in the hub, grease being forced into the inner ends of the sockets under pressure so that the pistons will at all times be forced outwardly thereby holding the hub plate in position to prevent wear and side play or lateral motion.

In the accompanying drawings:—Figure 1 is a section along the line A—A, of Fig. 3. Fig. 2 is a section along the line B—B, of Fig. 3. Fig. 3 is a vertical sectional view through the hub of the wheel having the improved plate mounted therein. Fig. 4 is an enlarged side elevation of one of the pistons. Fig. 5 is a section along the line 5—5, of Fig. 4.

Referring to the accompanying drawings it will be seen that this hub plate is mounted in an annular seat 10 formed in the inner face of the hub 11 of an engine wheel. Pockets 12 lead from the inner end of the seat 10 and communicate with passageways 13 having enlarged threaded outer end portions in which plugs 15 are positioned.

The hub plate 16 is very similar to that shown in my former applications and may be formed solid as shown in Fig. 3 or may be formed of a plurality of parts held together by any suitable means. This hub plate is positioned in the seat 10 surrounding the axle 17 and is provided with openings 18 through which the hollow pins 19 pass so that lubricating oil or grease which is forced into the groove 20 through the passageway 21 may pass through the pins 19 and into the pockets 22 formed in the outer face of the hub plate. This lubricating material is placed in the passageways 21 and threaded plugs 23 are then inserted in the threaded outer end portions of the passageways 21 thereby forcing the lubricating material through the hub plate. The inner end portions 24 of the pins 19 are solid and are positioned in sockets 25 in order to cause the hub plate to turn with the wheel thereby preventing independent movement between the hub plate and wheel and preventing the seat 10 from being worn when the wheel is in motion.

Pistons 26 extend from the inner face of the hub plate and are positioned in the pockets 12. These pistons are provided with angular grooves 27 adjacent their inner ends in which packing rings or suitable packing 28 are mounted, so that the oil or grease which is forced into the pockets by the plugs 15 will be prevented from passing around the pistons and out of the pockets. It will thus be seen that when the plugs 15 are tightened that the oil or grease which is in the enlarged outer end portions of the passageways 13 will be forced through the passageways 13 and into the inner ends of the pockets 12, thus coming into contact with the pistons 26 and forcing the hub plate outwardly against the bearing 29. This keeps the hub plate in position to take up side play or lateral motion.

The plugs 23 keep the lubricating oil or grease which passes through the pins 19 under pressure so that the outer face of the hub plate will at all times be well lubricated, thereby reducing the amount of friction between the hub plate and the bearing to a minimum amount.

It is of course understood that the plugs 15 and 23 must be tightened from time to time thus keeping the oil or grease at all times under the amount of pressure necessary. It will also be seen that these pistons may be formed integral with the hub plate, removably connected therewith or may be entirely separate from the hub plate and positioned in the pockets 12 in which case the pistons would not have to be renewed when the hub plate was worn out. It will also be noted that when the pistons are connected with the hub plate or formed integral therewith that they will assist the pins 19 in preventing independent rotation between the hub plate and wheel.

Having thus described the invention what is claimed as new, is:—

1. A wheel having an angular seat formed in the inner face and provided with pockets leading from the inner end of said seat and communicating with passageways having threaded outer end portions, a hub plate mounted in said seat, pistons extending from said hub plate into said pockets, and means threaded into the threaded outer end portions of said passageways to hold fluid or grease in said passageways under pressure, whereby the fluid or grease will have a tendency to force the hub plate outwardly.

2. A wheel having a seat formed in its inner face and provided with pockets leading from the inner end of said seat, a hub plate positioned in said seat, pistons extending from said hub plate into said pockets, and means for forcing fluid or grease into the inner ends of said pockets to normally move said hub plate out of said seat.

3. A wheel having an annular seat formed in its inner face and provided with pockets leading from the inner end of said seat and communicating with passageways provided with enlarged threaded outer end portions, a hub plate mounted in said seat, pistons extending from said hub plate into said pockets, packing rings at the inner end portions of said pistons, and plugs threaded into the outer end portions of said passageways to force fluid or grease through said passageways and into said pockets to force said hub plate outwardly.

4. A hub plate, pins extending through said hub plate and being hollow throughout the greater portion of their length, and pistons extending from said hub plate.

5. A wheel provided with a seat leading from its inner face and with pockets leading from said seat, a hub plate mounted in said seat, pistons positioned within said pockets, and means for forcing liquid or grease into the inner ends of said pockets to force said pistons out of said pockets and thereby force said hub plate out of said seat.

6. A wheel having a seat formed in one face and provided with pockets leading from said seat and communicating with passageways, a hub plate mounted in said seat, pistons extending from said plate into said seats, and pressure exerting means for forcing fluid through said passageways into said pockets to force said hub plate outwardly.

7. A wheel having a seat formed in one face and provided with pockets leading from said seat, a hub plate positioned in said seat, pistons extending from said plate into said pockets, and means forcing fluid into said pockets under pressure to normally move said plate out of said seat.

8. A wheel having a seat formed in one face, and provided with pockets leading from said seat, a hub plate mounted in said seat, pistons leading from said plate into said pockets, packing rings carried by said pistons, and means for forcing fluid into said pockets under pressure to normally force said plate out of said seat.

9. A hub plate, pins extending through and beyond said hub plate, and pistons extending from said hub plate.

In testimony whereof I hereunto affix my signature in presence of two witnesses.

MATTHIAS CHRISTMAN.

Witnesses:
W. T. KENNEDY,
GEORGE A. McLAUGHLIN.

Copies of this patent may be obtained for five cents each, by addressing the "Commissioner of Patents, Washington, D. C."